United States Patent
Kawasaki et al.

(10) Patent No.: US 12,143,547 B2
(45) Date of Patent: Nov. 12, 2024

(54) IMAGE READING APPARATUS WITH POSTURE ADJUSTMENT PORTION AND STIMULUS OUTPUT PORTION

(71) Applicant: KYOCERA Document Solutions Inc., Osaka (JP)

(72) Inventors: Kenichiro Kawasaki, Osaka (JP); Kazuhisa Hirahara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/018,254

(22) PCT Filed: Mar. 9, 2022

(86) PCT No.: PCT/JP2022/010308
§ 371 (c)(1),
(2) Date: Jan. 26, 2023

(87) PCT Pub. No.: WO2022/230377
PCT Pub. Date: Nov. 3, 2022

(65) Prior Publication Data
US 2023/0288868 A1    Sep. 14, 2023

(30) Foreign Application Priority Data
Apr. 27, 2021  (JP) ................................ 2021-074684

(51) Int. Cl.
*G03G 21/18* (2006.01)
*H04N 1/024* (2006.01)

(52) U.S. Cl.
CPC ....... *H04N 1/02481* (2013.01); *H04N 1/0249* (2013.01)

(58) Field of Classification Search
None
See application file for complete search history.

(56) References Cited

U.S. PATENT DOCUMENTS

| | | | |
|---|---|---|---|
| 6,628,436 B1 * | 9/2003 | Sone | H04N 1/00031 |
| | | | 341/155 |
| 2007/0235542 A1 * | 10/2007 | Tsutsumi | H04N 1/1048 |
| | | | 235/454 |

FOREIGN PATENT DOCUMENTS

| | | | |
|---|---|---|---|
| EP | 1215874 A1 * | 6/2002 | ............... H04N 1/03 |
| EP | 2869547 A1 | 5/2015 | |
| JP | 2006237752 A | 9/2006 | |
| JP | 2012063617 A | 3/2012 | |

OTHER PUBLICATIONS

European Patent Office, Office Action Issued in Application No. 22795300.7, Nov. 29, 2023, Germany, 9 pages.

* cited by examiner

*Primary Examiner* — Thomas D Lee
(74) *Attorney, Agent, or Firm* — Alleman Hall & Tuttle LLP

(57) ABSTRACT

An image forming apparatus (100) includes a photoelectric conversion portion (24) that receives light reflected by a document sheet and outputs an electric signal based on the light, a posture adjustment portion (400) having an operation shaft (34) rotatable about a first axis (AX1) and that adjusts a posture of the photoelectric conversion portion (24) according to rotation of the operation shaft (34), and a stimulus output portion (402) that outputs a stimulus perceivable by an operator of the operation shaft (34) each time the operation shaft (34) is rotated by a predetermined specific angle.

5 Claims, 7 Drawing Sheets

IMAGE READING APPARATUS WITH POSTURE ADJUSTMENT PORTION AND STIMULUS OUTPUT PORTION

TECHNICAL FIELD

The present invention relates to an image reading apparatus and an image forming apparatus.

BACKGROUND ART

An image forming apparatus is known that includes a reading unit that reads an image of a document sheet placed on a contact glass. The reading unit includes optical elements such as a light source, a mirror, a lens, and a charge coupled device (CCD), and a box-shaped housing that houses the optical elements. A bottom portion of the housing is supported by a housing support portion provided at an upper portion of the apparatus main body of the image forming apparatus.

In the image forming apparatus, posture of the housing supported by the housing support portion may be distorted due to variations in a shape of the housing support portion. In this case, image quality of image data output by the reading unit is degraded. On the other hand, an image forming apparatus is known in which the posture of the housing can be adjusted by providing a mechanism for adjusting a support position of one of the corners of the bottom portion of the housing in the up-down direction (for example, See Patent Document 1).

CITATION LIST

Patent Literature

[Patent Document 1] JP-2006-237752 A

SUMMARY OF INVENTION

Technical Problem

The degradation of image quality of the image data output by the reading unit due to the distortion of the posture of the housing can also be suppressed by adjusting the posture of the CCD. More specifically, it is conceivable to provide a mechanism for adjusting the posture of the CCD inside the housing.

Here, in a case where an operating portion used for adjusting the posture of the CCD is formed in a rotatable shaft shape, it is difficult for an operator of the operation portion to know the adjustment amount of the posture of the CCD, and thus it may be difficult to make fine adjustments.

Note that in some cases, the reading unit is provided with a mechanism for adjusting the posture of the mirror; however, in a case where an operation portion of the mechanism is formed in a rotatable shaft shape, the same problem arises.

An object of the present invention is to provide an image reading apparatus and an image forming apparatus that make it possible to easily know an adjustment amount of a posture of an optical element.

Solution to Problem

An image reading apparatus according to one aspect of the present invention includes an optical element, a posture adjustment portion, and a stimulus output portion. The optical element is arranged on an optical path from a light emitting portion that emits light irradiated onto a document sheet to a photoelectric conversion portion that receives light reflected by the document sheet and outputs an electrical signal based on the light. The posture adjustment portion has an operation shaft rotatable about a first axis, and adjusts a posture of the optical element according to rotation of the operation shaft. The stimulus output portion outputs a stimulus perceivable by an operator of the operation shaft every time the operation shaft is rotated by a predetermined specific angle.

An image forming apparatus according to another aspect of the present invention includes the image reading apparatus and an image forming portion. The image forming portion forms an image based on image data output by the image reading apparatus.

Effect of Invention

According to the present invention, it is possible to easily know the adjustment amount of the posture of the optical element.

DESCRIPTION OF EMBODIMENTS

Embodiments of the present invention will be described below with reference to the accompanying drawings. Note that the following embodiments are examples of implementing the present invention and do not limit the technical scope of the present invention.

First Embodiment

First, a configuration of an image forming apparatus 100 according to a first embodiment of the present invention will be described with reference to FIG. 1. Note that in FIG. 1, an optical path R1 from a light emitting portion 21A in an image reading portion 2 to a CCD 24 is indicated by a dashed line with an arrow.

Note that for convenience of explanation, a vertical direction in an installed state (state shown in FIG. 1) in which the image forming apparatus 100 can be used is defined as an up-down direction D1. In addition, a front-rear direction D2 is defined with the surface on the front side of the paper surface of the image forming apparatus 100 shown in FIG. 1 as a front surface (front surface). Further, a left-right direction D3 is defined with the front surface of the image forming apparatus 100 in the installed state as a reference.

The image forming apparatus 100 is a multifunction peripheral having a plurality of functions such as a scanning function that reads an image of a document sheet, a printing function that forms an image based on image data, a fax function, a copying function, and the like. Note that the present invention may be applied to image forming apparatuses such as facsimile machines and copiers having the scanning function.

Figure 1:
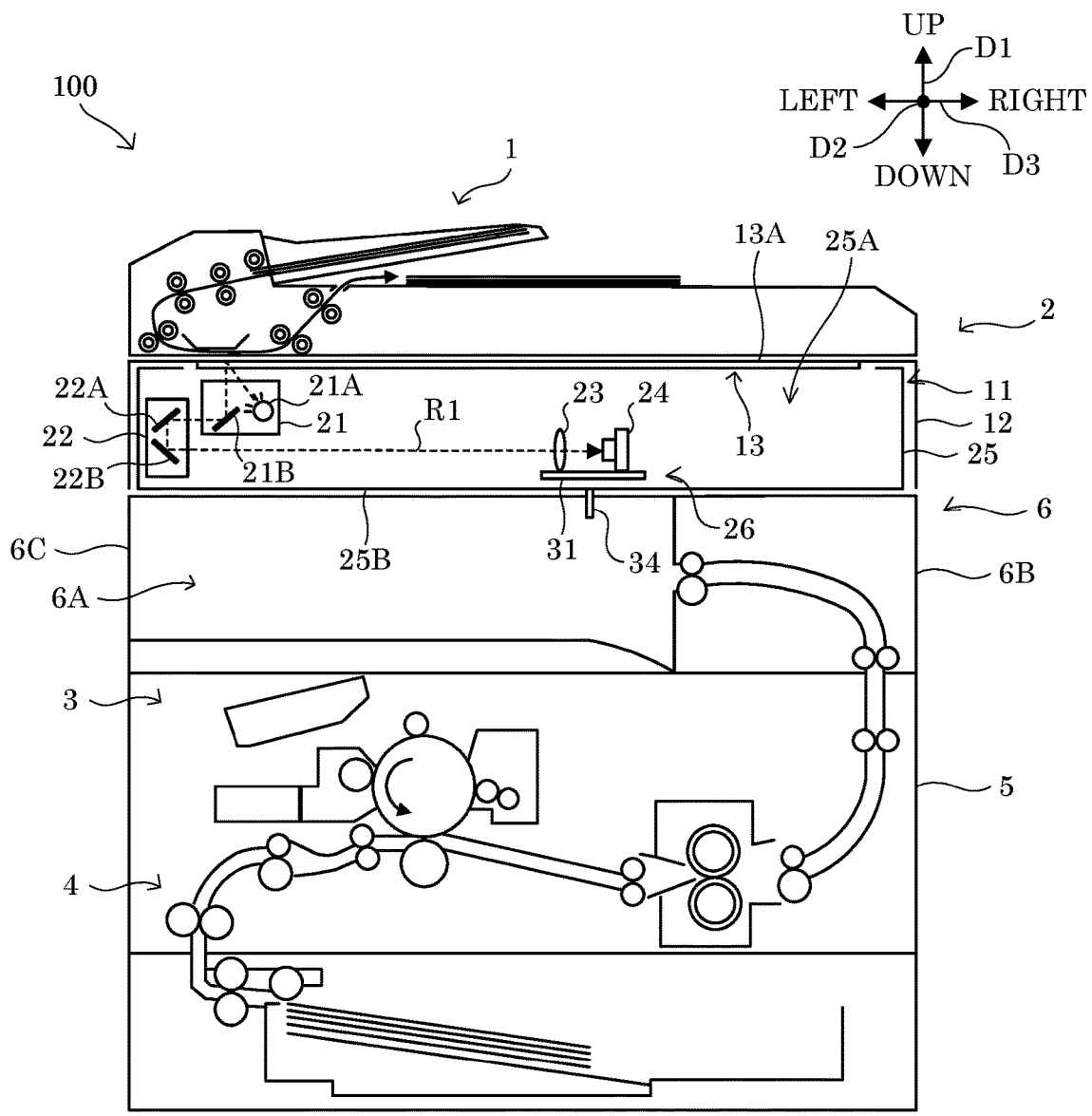
FIG. 1 is a cross-sectional view showing a configuration of an image forming apparatus according to a first embodiment of the present invention.

As shown in FIG. 1, the image forming apparatus 100 includes an auto document feeder (ADF) 1, an image reading portion 2, an image forming portion 3, a sheet feed portion 4, an apparatus body 5, and a housing support portion 6. An apparatus including the image reading portion 2 is an example of the image reading apparatus of the present invention.

The ADF 1 conveys a document sheet whose image is to be read by the image reading portion 2. The ADF 1 includes a document setting portion, a plurality of conveying rollers, a document sheet holder, and a sheet discharge portion. In addition, the ADF 1 is supported so as to be openable and closable with respect to a document sheet placement surface 13A (see FIG. 1), and also functions as a document sheet cover for a document sheet placed on the document sheet placement surface 13A.

The image reading portion 2 achieves the scanning function. More specifically, the image reading portion 2 reads an image from a document sheet conveyed by the ADF 1, and outputs image data including the read image. In addition, the image reading portion 2 reads an image from a document sheet placed on the document sheet placement surface 13A (see FIG. 1), and outputs image data including the read image.

The image forming portion 3 achieves the printing function. More specifically, the image forming portion 3 forms an image by an electrophotographic method. The image forming portion 3 includes a photoconductor drum, a charging roller, a laser scanning unit, a developing device, a transfer roller, a cleaning device, and a fixing device. The image forming portion 3 forms an image based on image data that is output from the image reading portion 2.

The sheet feed portion 4 supplies a sheet to the image forming portion 3. The sheet feed portion 4 includes a sheet feed cassette and a plurality of conveying rollers. The image forming portion 3 forms an image on a sheet that is supplied from the sheet feed portion 4. A sheet on which an image is formed by the image forming portion 3 is discharged to a sheet discharge space 6A (see FIG. 1).

The apparatus body 5 is a housing that houses the image forming portion 3 and the sheet feed portion 4. As shown in FIG. 1, the sheet feed portion 4 is provided at a lower portion of the apparatus body 5. In addition, the image forming portion 3 is provided above the sheet feed portion 4 in the apparatus body 5.

In addition, the apparatus body 5 supports the ADF 1 and the image reading portion 2. As shown in FIG. 1, the image reading portion 2 is provided above the apparatus body 5. Further, the ADF 1 is provided above the image reading portion 2.

The housing support portion 6 supports a bottom portion 25B (see FIG. 1) of a housing 25 of the image reading portion 2. In addition, the housing support portion 6 forms the sheet discharge space 6A (see FIG. 1), which is open in at least one direction along a horizontal direction below the housing 25.

As shown in FIG. 1, the housing support portion 6 is provided at an upper portion of the apparatus body 5. The sheet discharge space 6A is a space in which a front side and a left side of the image forming apparatus 100 are open. A right-side support pillar 6B (see FIG. 1) that is erected facing upward is provided on the right side of the sheet discharge space 6A. A rear-side support pillar 6C (see FIG. 1) that is erected facing upward is provided on a rear side of the sheet discharge space 6A. The housing 25 of the image reading portion 2 is supported by an upper surface of the right-side support pillar 6B and an upper surface of the rear-side support pillar 6C.

Next, the image reading portion 2 will be described with reference to FIG. 1 and FIG. 2.

As shown in FIG. 1, the image reading portion 2 includes a reading unit 11, an exterior portion 12 and a contact glass 13.

The exterior portion 12 is a resin cover that covers a side surface of the reading unit 11. A rectangular opening portion that opens facing upward is provided in an upper portion of the exterior portion 12.

The contact glass 13 is attached to the opening portion of the exterior portion 12 from below the opening portion. The opening portion is closed by the contact glass 13. A document sheet that is to be read is placed on the contact glass 13. That is, an upper surface of the contact glass 13 functions as the document sheet placement surface 13A on which the document sheet is placed.

The reading unit 11 is provided below the contact glass 13. As shown in FIG. 1, the reading unit 11 includes a first carriage 21, a second carriage 22, an optical lens 23, a charge coupled device (CCD) 24, a housing 25 and a posture adjustment portion 26.

The housing 25 forms a housing space 25A under the document sheet placement surface 13A for housing each component of the reading unit 11 including the CCD 24. The housing 25 is formed in a box shape with an open top. More specifically, as shown in FIG. 2, the housing 25 includes a rectangular bottom portion 25B elongated in the left-right direction D3 and four side wall portions 25C erected along each side of the bottom portion 25B. The housing space 25A is formed by the bottom portion 25B and the four side wall portions 25C. The housing 25 is formed of a sheet metal member.

The first carriage 21 is provided inside the housing 25 so as to be movable in the left-right direction D3. The first carriage 21 is formed elongated in the front-rear direction D2. As shown in FIG. 1, the first carriage 21 includes a light emitting portion 21A and a first mirror 21B. The light emitting portion 21A and the first mirror 21B are provided so as to be movable integrally with the first carriage 21.

The light emitting portion 21A emits light from below the document sheet placement surface 13A toward the document sheet placement surface 13A. The light emitting portion 21A has a plurality of light emitting elements arranged along the front-rear direction D2. The first mirror 21B is formed elongated in the front-rear direction D2. The first mirror 21B reflects the light emitted from the light emitting portion 21A and reflected by the document sheet placed on the document sheet placement surface 13A toward a second mirror 22A of the second carriage 22.

The first carriage 21 receives a driving force supplied from a motor (not shown) and moves in the left-right direction D3. Thus, the irradiated position of the light emitted from the light emitting portion 21A on the document sheet placed on the document sheet placement surface 13A moves in the left-right direction D3.

The second carriage 22 is provided inside the housing 25 so as to be movable in the left-right direction D3. The second carriage 22 is formed elongated in the front-rear direction D2. As shown in FIG. 1, the second carriage 22 includes the second mirror 22A and a third mirror 22B. The second mirror 22A and the third mirror 22B are provided so as to be movable integrally with the second carriage 22.

The second mirror 22A reflects light reflected by the first mirror 21B toward the third mirror 22B. The third mirror 22B reflects light reflected by the second mirror 22A toward the optical lens 23.

The second carriage 22 is provided on a left side of the first carriage 21 inside the housing 25. The second carriage 22 is interlocked with the first carriage 21 and provided so as to be movable in the same direction as the first carriage 21. In addition, the second carriage 22 is provided so as to be movable at half the moving speed of the first carriage 21.

The optical lens 23 collects light reflected by the third mirror 22B and causes the light to enter the CCD 24.

The CCD 24 receives light reflected by the document sheet placed on the document sheet placement surface 13A and outputs an electrical signal based on the light. The CCD 24 is an image sensor having a plurality of photoelectric conversion elements arranged along the front-rear direction D2. The CCD 24 is an example of a photoelectric conversion portion of the present invention.

In the image reading portion 2, light emitted from the light emitting portion 21A and reflected by the document sheet that is to be read passes through the first mirror 21B, the second mirror 22A, the third mirror 22B, and the optical lens 23 and enters the CCD 24. Thus, the CCD 24 outputs an analog electrical signal corresponding to the image of the document sheet that is to be read. An analog electrical signal output from the CCD 24 is input to an analog front end circuit (not shown). The analog front end circuit converts an input analog electrical signal into a digital electrical signal (image data) and outputs the digital electrical signal. Image data output from the analog front end circuit is input to the control portion (not shown).

In the image forming apparatus 100, the posture of the housing 25 supported by the housing support portion 6 may be distorted due to variations in the shape of the housing support portion 6 or the like. In this case, the image quality of the image data output by the reading unit 11 is degraded. On the other hand, an image forming apparatus is known in which the posture of the housing 25 can be adjusted by providing a mechanism for adjusting a supporting position of any corner of the bottom portion 25B of the housing 25 in the up-down direction D1.

Here, degradation of the image quality of the image data output by the reading unit 11 due to distortion of the posture of the housing 25 can also be suppressed by adjusting the posture of the CCD 24. More specifically, it is conceivable to provide a mechanism for adjusting the posture of the CCD 24 inside the housing 25.

However, in a case where the operation portion used for adjusting the posture of the CCD 24 is provided inside the housing 25, it is necessary to remove the contact glass 13 and open the upper portion of the housing 25 in order to operate the operation portion. In this case, dust may enter inside the housing 25, and the image quality of the image data output by the reading unit 11 may be degraded by the dust adhering to optical elements such as the light emitting portion 21A, the first mirror 21B, the second mirror 22A, the third mirror 22B, the optical lens 23, and the CCD 24 provided on the optical path R1.

On the other hand, in the image forming apparatus 100 according to the first embodiment of the present invention, as will be described below, it is possible to suppress degradation of image quality of image data output by the reading unit 11 without adjusting the posture of the housing 25 and opening the upper portion of the housing 25.

Figure 4:
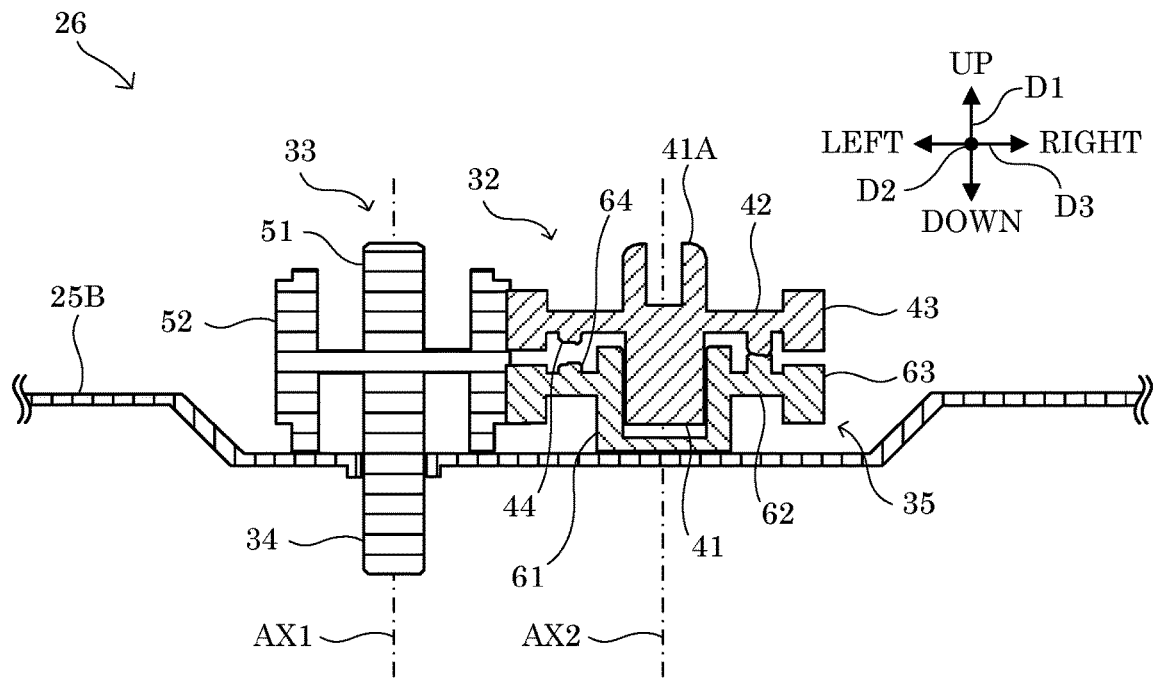
FIG. 4 is a cross-sectional view showing a configuration of the posture adjustment portion of the image forming apparatus according to the first embodiment of the present invention.
Figure 5:
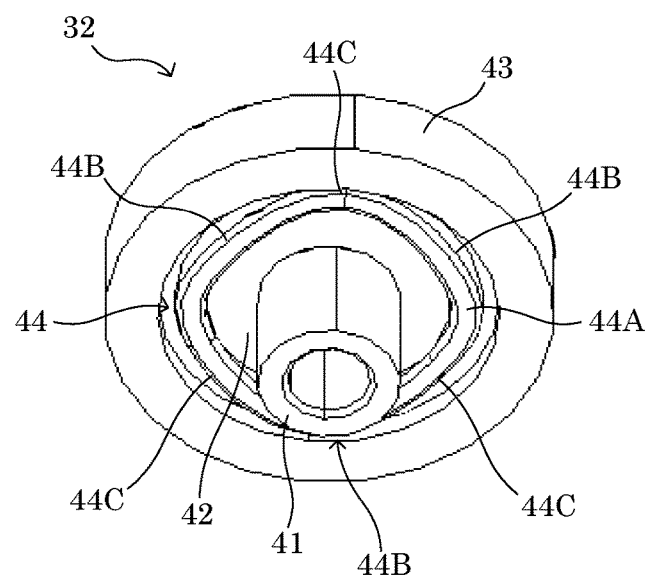
FIG. 5 is a perspective view showing a configuration of a second gear of the image forming apparatus according to the first embodiment of the present invention.
Figure 6:
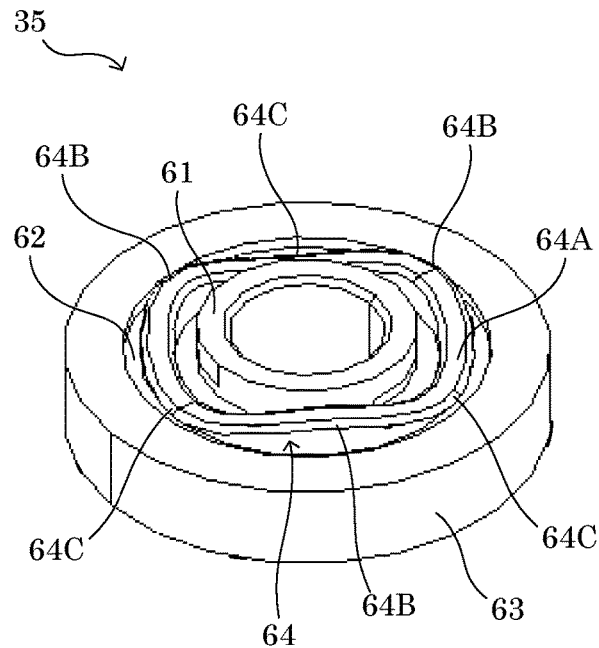
FIG. 6 is a perspective view showing a configuration of a third gear of the image forming apparatus according to the first embodiment of the present invention.

Next, the posture adjustment portion 26 will be described with reference to FIG. 1 to FIG. 6. Here, FIG. 3 is a diagram showing a state in which the support member 31 is removed from the housing 25 shown in FIG. 2. In addition, FIG. 4 is a cross-sectional view of a second gear 32, a first gear 33, and a third gear 35 shown in FIG. 3 taken along a plane orthogonal to the front-rear direction D2. Moreover, FIG. 5 is a perspective view of the second gear 32 as viewed from below. Further, FIG. 6 is a perspective view of the third gear 35 as viewed from above. Note that in FIG. 4, a first axis AX1, which is a rotation axis of the first gear 33, and a second axis AX2, which is a rotation axis common to the second gear 32 and the third gear 35, are indicated by dash-dot chain lines.

The posture adjustment portion 26 has an operation portion 34 (see FIG. 1) provided outside the housing 25 and adjusts the posture of the CCD 24 according to operation on the operation portion 34.

As shown in FIG. 1, the operation portion 34 is provided below the bottom portion 25B of the housing 25. As shown in FIG. 1 and FIG. 4, the operation portion 34 is formed in a shape of a shaft penetrating through the bottom portion 25B of the housing 25 and projecting in a downward direction. The operation portion 34 is rotatable about the first axis AX1 (see FIG. 4) along the projecting direction. The posture adjustment portion 26 adjusts the posture of the CCD 24 according to rotation of the operation portion 34.

Figure 2:
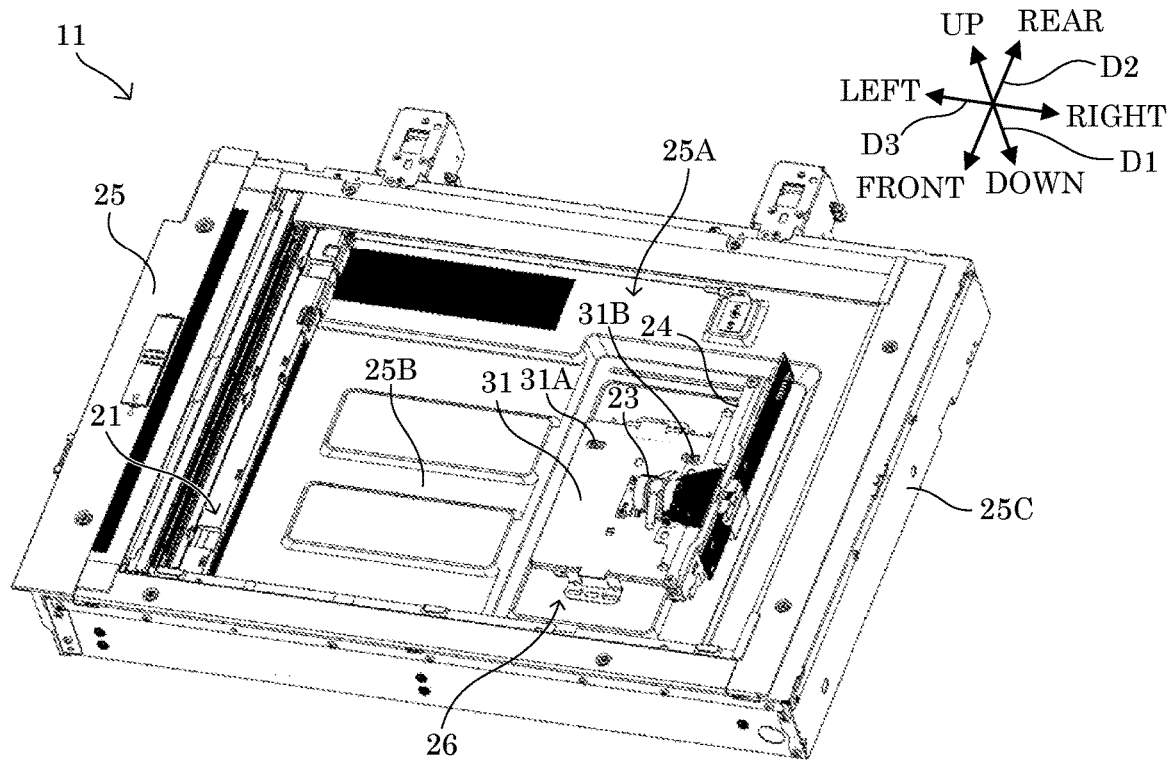
FIG. 2 is a perspective view showing a configuration of a reading unit of the image forming apparatus according to the first embodiment of the present invention.
Figure 3:
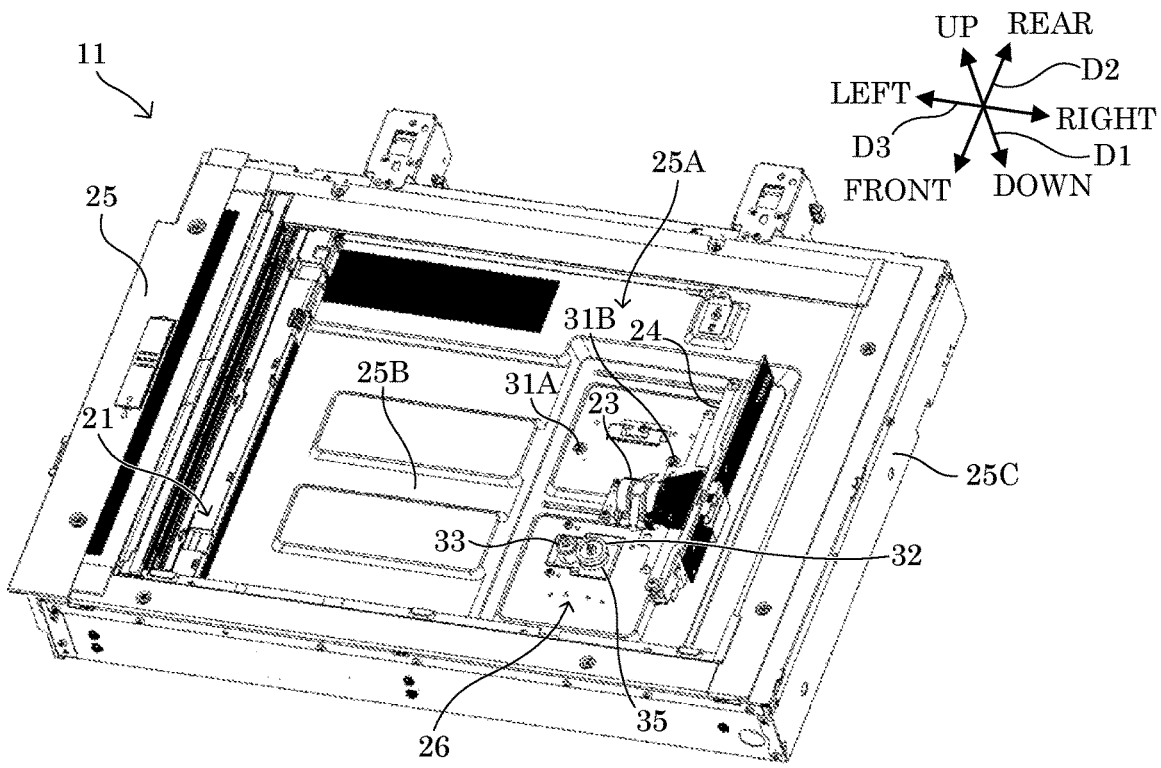
FIG. 3 is a perspective view showing a configuration of a posture adjustment portion of the image forming apparatus according to the first embodiment of the present invention.

As shown in FIG. 2 and FIG. 3, the posture adjustment portion 26 includes the support member 31, the second gear 32, the first gear 33 and the third gear 35 in addition to the operation portion 34.

The support member 31 supports the CCD 24 below the CCD 24. As shown in FIG. 2, the support member 31 is a plate-like member formed in a rectangular shape. A substrate including the optical lens 23 and the CCD 24 is attached to an upper surface of the support member 31. That is, the support member 31 supports the optical lens 23 and the CCD 24. Note that the support member 31 may be a member having an arbitrary shape. In addition, the support member 31 does not need to support the optical lens 23.

As shown in FIG. 2 and FIG. 3, the support member 31 is supported from below by a support screw 31A (see FIG. 2 and FIG. 3), a support screw 31B (see FIG. 2 and FIG. 3), and the second gear 32. The support screw 31A supports a rear-end portion on a left side of a bottom surface of the support member 31. The support screw 31B supports a rear-end portion on a right side of the bottom surface of the support member 31. The second gear 32 supports a front-end portion of the bottom surface of the support member 31.

The second gear 32 is provided below the support member 31 so as to be rotatable about the second axis AX2 (see FIG. 4) parallel to the first axis AX1. The second gear 32 supports the support member 31. The second gear 32 displaces in the up-down direction D1 according to rotation. The second gear 32 is a spur gear.

As shown in FIG. 4 and FIG. 5, the second gear 32 has a shaft hole portion 41, a disc-shaped portion 42, a toothed portion 43, and a first cam portion 44. The shaft hole portion 41 is formed in a cylindrical shape, and a rotating shaft erected at the bottom portion 25B of the housing 25 is inserted through the shaft hole portion 41. An end portion 41A above the shaft hole portion 41 comes in contact with the bottom surface of the support member 31 to support the support member 31. The disc-shaped portion 42 is formed in a disc shape centered on the second axis AX2. The toothed portion 43 is provided at an outer circumferential portion of the disc-shaped portion 42. The toothed portion 43 has a plurality of teeth arranged along an outer circumference of the disc-shaped portion 42.

The first cam portion 44 is formed on a lower side surface of the disc-shaped portion 42 orthogonal to the up-down direction D1. In other words, the first cam portion 44 is formed at a portion facing the third gear 35. As shown in FIG. 5, the first cam portion 44 is formed outside the shaft hole portion 41 and inside the toothed portion 43. The first cam portion 44 forms a first cam surface 44A that rises and falls along a circumferential direction of the second axis AX2. The first cam surface 44A is a smooth inclined surface continuous along the circumferential direction of the second axis AX2. As shown in FIG. 5, the first cam portion 44 includes three peak portions 44B arranged at equal intervals along the circumferential direction of the second axis AX2, and three valley portions 44C arranged at equal intervals along the circumferential direction of the second axis AX2 and arranged between two circumferentially adjacent peak portions 44B. The peak portions 44B are formed to project downward from the toothed portion 43. Note that the number of the peak portions 44B and the number of the valley portions 44C need not be limited to three.

The first gear 33 is provided so as to be able to rotate integrally with the operation portion 34. That is, the first gear 33 is provided so as to be rotatable about the first axis AX1. The first gear 33 engages with the second gear 32 and the third gear 35. The first gear 33 is a spur gear.

As shown in FIG. 4, the first gear 33 has a shaft portion 51 and a toothed portion 52. The shaft portion 51 is formed in a cylindrical shape. The shaft portion 51 is provided to penetrate the bottom portion 25B of the housing 25 and project downward. A projecting portion of the shaft portion 51 projecting from the bottom portion 25B is the operation portion 34. The toothed portion 52 is provided along a circumferential direction of the shaft portion 51. The toothed portion 52 is provided so as to be able to rotate integrally with the shaft portion 51. The toothed portion 52 has a plurality of teeth arranged along the circumferential direction of the shaft portion 51.

For example, the toothed portion 52 has 0.4 times the number of teeth of the second gear 32. In this case, when the first gear 33 rotates 180 degrees, the second gear 32 rotates 72 degrees. That is, when the first gear 33 makes a half turn, the second gear 32 makes a one-fifth turn.

The first gear 33 is rotated by a rotational driving force input via the operation portion 34 by the hand of the operator operating the operation portion 34. Thus, the second gear 32 and the third gear 35 that engage with the first gear 33 rotate.

The third gear 35 is provided below the second gear 32 so as to be rotatable about the second axis AX2. The third gear 35 engages with the first gear 33. The third gear 35 is a spur gear.

As shown in FIG. 4 and FIG. 6, the third gear 35 includes a shaft hole portion 61, a disc-shaped portion 62, a toothed portion 63, and a second cam portion 64. The shaft hole portion 61 is formed in a cylindrical shape, and the shaft hole portion 41 of the second gear 32 is inserted therethrough. The disc-shaped portion 62 is formed in a disc shape centered on the second axis AX2. The toothed portion 63 is provided at an outer circumferential portion of the disc-shaped portion 62. The toothed portion 63 has a plurality of teeth arranged along an outer circumference of the disc-shaped portion 62.

The second cam portion 64 is formed on an upper side surface of the disc-shaped portion 62 orthogonal to the up-down direction D1. In other words, the second cam portion 64 is formed at a portion facing the second gear 32. As shown in FIG. 6, the second cam portion 64 is formed outside the shaft hole portion 61 and inside the toothed portion 63. The second cam portion 64 forms a second cam surface 64A that rises and falls along the circumferential direction of the second axis AX2. The second cam surface 64A is a smooth inclined surface continuous along the circumferential direction of the second axis AX2. As shown in FIG. 6, the second cam portion 64 includes three peak portions 64B arranged at equal intervals along the circumferential direction of the second axis AX2, and three valley portions 64C arranged at equal intervals along the circumferential direction of the second axis AX2 and arranged between two circumferentially adjacent peak portions 64B. The peak portions 64B are formed to project further upward than the toothed portion 63. Note that the number of the peak portions 64B and the number of the valley portions 64C need not be limited to three.

The second cam surface 64A is formed in a shape corresponding to the first cam surface 44A. More specifically, the second cam surface 64A is formed so as to be able to come into close contact with the first cam surface 44A. In other words, the second cam surface 64A is formed such that the peak portions 64B are able to come in contact with the valley portions 44C of the first cam surface 44A, while at the same time the valley portions 64C are able to come in contact with the peak portions 44B of the first cam surface 44A. Note that the first cam surface 44A does not need to be formed in a shape corresponding to the second cam surface 64A. In addition, instead of the first cam portion 44, the second gear 32 may include one or a plurality of projecting portions projecting from the lower side surface of the disc-shaped portion 42 to the same positions as the peak portions 44B.

The third gear 35 supports the second gear 32 from below the second gear 32. More specifically, the second cam surface 64A of the third gear 35 comes in contact with the peak portions 44B of the second gear 32 to support the second gear 32.

The toothed portion 63 has a number of teeth different from the number of teeth of the second gear 32. For example, the number of teeth of the toothed portion 63 is one less than the number of teeth of the second gear 32. Thus, the third gear 35 rotates at a rotational speed slightly higher than that of the second gear 32 in accordance with the rotation of the first gear 33. Therefore, the support position of the second gear 32 on the second cam surface 64A, that is, the contact position with the peak portion 44B of the first cam portion 44 moves at a rotational speed corresponding to the speed difference between the second gear 32 and the third gear 35. Thus, the second gear 32 is displaced in the up-down direction D1 by the second cam surface 64A. Accordingly, the posture of the support member 31 supported by the second gear 32 changes, and the postures of the optical lens 23 and the CCD 24 supported by the support member 31 also change. The second cam surface 64A is an example of a cam surface of the present invention. In addition, the peak portion 44B of the first cam portion 44 is an example of a pressed portion of the present invention. Note that the number of teeth of the toothed portion 63 may be one more than the number of teeth of the second gear 32. In addition, the difference in the number of teeth between the second gear 32 and the third gear 35 may be set arbitrarily within a range that does not interfere with rotation according to the rotation of the first gear 33.

In this way, in the image forming apparatus 100, the operation portion 34 is provided outside the housing 25. Thus, compared to a configuration in which the operation portion 34 is provided inside the housing 25, it is possible to suppress degradation of the image quality of image data output by the reading unit 11 without opening the upper portion of the housing 25. In addition, it is possible to suppress degradation of the image quality of image data output by the reading unit 11 without adjusting the posture of the housing 25.

Further, in the image forming apparatus 100, the operation portion 34 is provided below the bottom portion 25B of the housing 25. Therefore, compared to a configuration in which the operation portion 34 is provided outside a side wall portion 25C of the housing 25, it is possible to avoid an increase in size of the image forming apparatus 100 in the horizontal direction.

In addition, in the image forming apparatus 100, the operation portion 34 is formed in a shaft shape that rotates around the first axis AX1, and the posture of the CCD 24 is adjusted according to the rotation of the operation portion 34. Thus, compared to a configuration in which the operation portion 34 is provided so as to be able to move along the horizontal direction and the posture of the CCD 24 is adjusted according to the movement along the horizontal direction, the configuration of the operation portion 34 can be made smaller.

In addition, in the image forming apparatus 100, the second gear 32 that engages with the first gear 33 that rotates integrally with the operating portion 34 is provided, and the posture of the CCD 24 is adjusted by the second gear 32 being displaced in the up-down direction D1 according to rotation of the operation portion 34. Thus, compared to a configuration in which the posture of the CCD 24 is adjusted by the operation portion 34 being displaced in the up-down direction D1 according to the rotation of the operation portion 34, the amount that the operation portion 34 projects from the bottom portion 25B does not change, and thus it is possible to avoid changes in the operability of the operation portion 34.

In addition, in the image forming apparatus 100, the third gear 35 that rotates at a speed different from that of the second gear 32 is provided below the second gear 32, and the second gear 32 is displaced in the up-down direction D1 by the second cam portion 64 of the third gear 35. Thus, compared to a configuration in which the third gear 35 is not provided and the second gear 32 is displaced in the up-down direction D1 by a cam surface formed on the bottom portion 25B of the housing 25, it is possible to reduce the amount of displacement of the second gear 32, that is, the amount of adjustment of the posture of the CCD 24, when the operation portion 34 is operated by a predetermined amount. In other words, it is possible to perform finer adjustment.

Note that the posture adjustment portion 26 does not need to include the third gear 35. In addition, the posture adjustment portion 26 does not need to include both the third gear 35 and the second gear 32. Further, the posture adjustment portion 26 may, instead of the operation portion 34, include an operation portion that is provided so as to be able to move along the horizontal direction. For example, together with providing a rod-shaped operation portion extending in the up-down direction D1 so as to be able to move along the horizontal direction, it is also conceivable to provide, at the contact portion of the bottom surface of the support member 31 with the upper end portion of the operation portion, an inclined surface that is inclined in the up-down direction along the direction of movement of the operation portion.

Second Embodiment

Next, a configuration of an image forming apparatus 100 according to a second embodiment of the present invention will be described with reference to FIG. 7.

Figure 7:
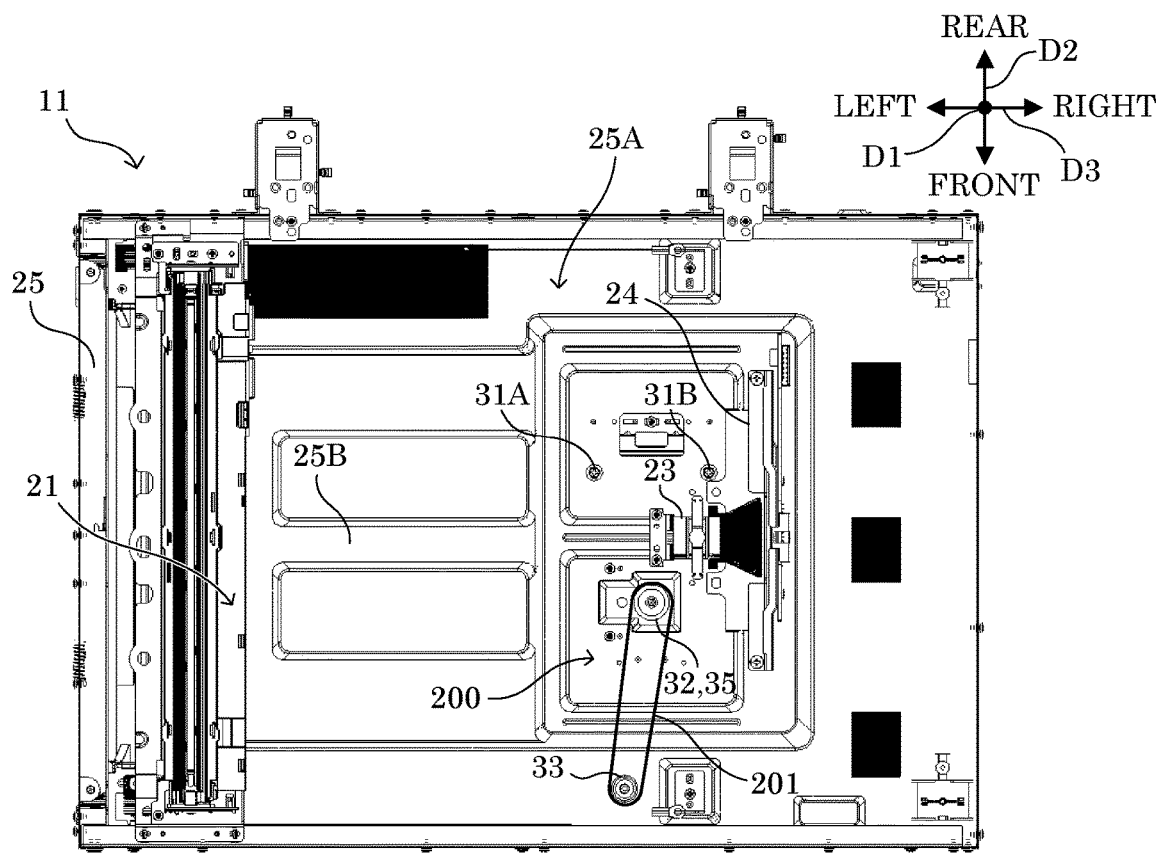
FIG. 7 is a plan view showing a configuration of a posture adjustment portion of an image forming apparatus according to a second embodiment of the present invention.

The image forming apparatus 100 according to the second embodiment includes a posture adjustment portion 200 shown in FIG. 7 instead of the posture adjustment portion 26.

The posture adjustment portion 200 includes a support member 31, a second gear 32, a first gear 33, an operation portion 34, a third gear 35, and a belt member 201. The configuration of the support member 31, the second gear 32, and the third gear 35 is the same as that of the posture adjustment portion 26.

In the posture adjustment portion 200, the first gear 33 is provided apart from the second gear 32 in a direction orthogonal to a second axis AX2, as shown in FIG. 7. Therefore, the operation portion 34 integrally formed with the first gear 33 is also provided apart from the second gear 32 in the direction orthogonal to the second axis AX2. Note that the shapes of the first gear 33 and the operation portion 34 are the same as those of the posture adjustment portion 26.

A belt member 201 is wound around the first gear 33, the second gear 32 and the third gear 35, and transmits the rotational driving force input to the first gear 33 to the second gear 32 and the third gear 35. More specifically, the belt member 201, on the inner peripheral surface thereof, has a toothed portion that engages with the first gear 33, the second gear 3, and the third gear 35.

Thus, the posture of the CCD 24 can be adjusted in the same manner as in the case of the posture adjustment portion 26. In addition, in the posture adjustment portion 200, it is possible to arrange the first gear 33 and the operation portion 34 at arbitrary positions on a bottom portion 25B of the housing 25. Therefore, compared to the posture adjustment portion 26, it is possible to improve the operability of the operation portion 34.

Third Embodiment

Next, a configuration of an image forming apparatus 100 according to a third embodiment of the present invention will be described with reference to FIG. 8 and FIG. 9. Note that in FIG. 9, a third axis AX3, which is a rotation axis of a seventh gear 305, is indicated by a black circle. In addition, in FIG. 9, a fourth axis AX4, which is a rotation axis of a fourth gear 302, and a fifth axis AX5, which is a rotation axis common to a fifth gear 303 and a sixth gear 304, are indicated by dash-dot chain lines.

Figure 8:
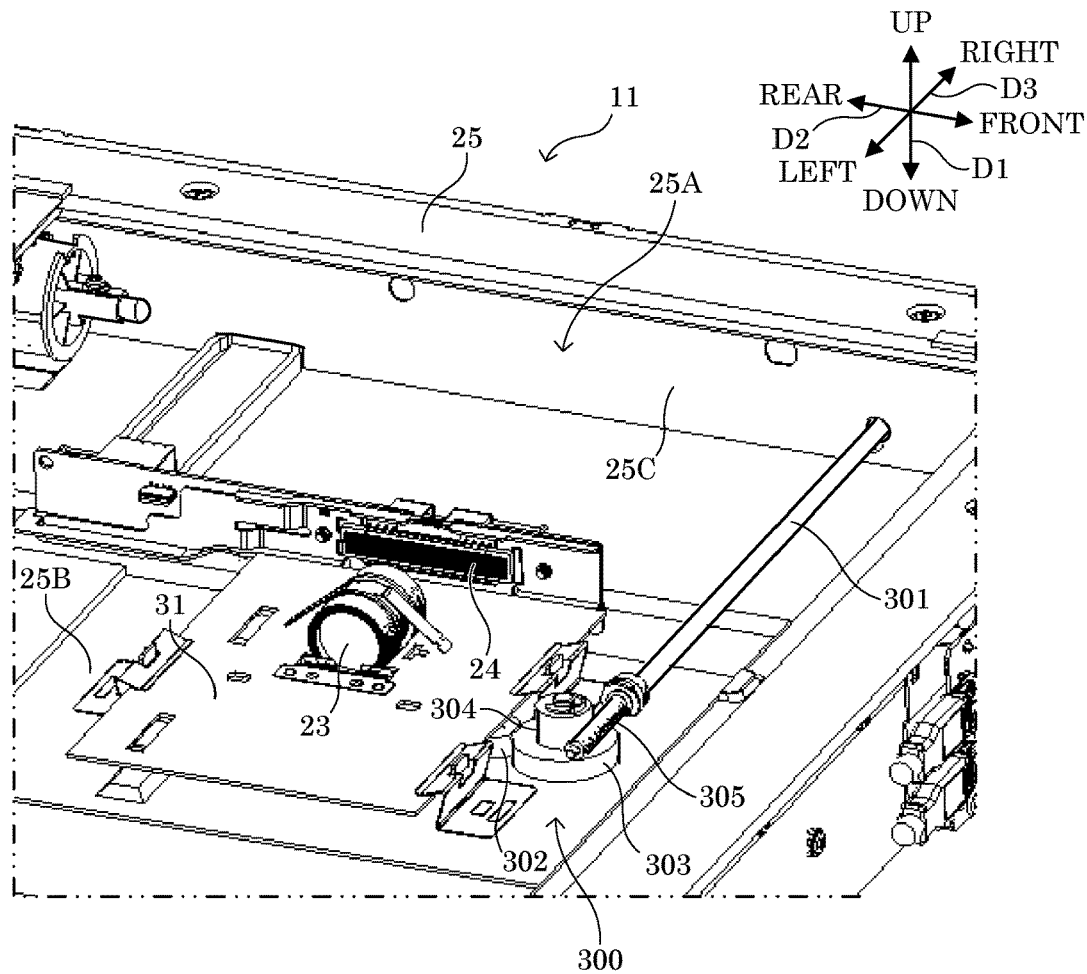
FIG. 8 is a perspective view showing a configuration of a posture adjustment portion of an image forming apparatus according to a third embodiment of the present invention.
Figure 9:
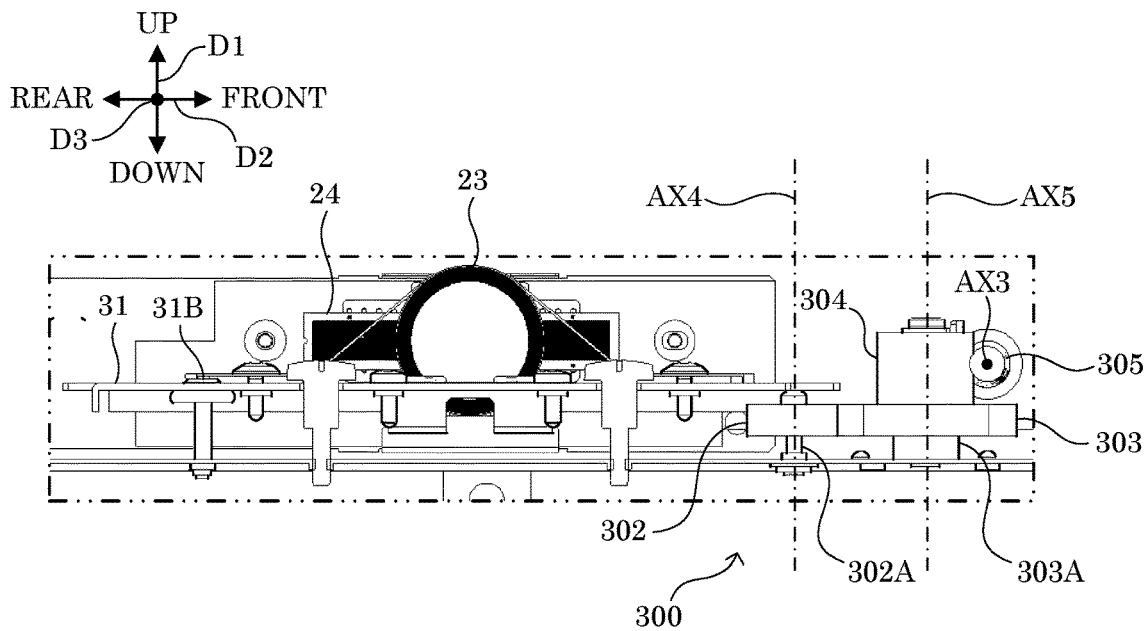
FIG. 9 is a side view showing a configuration of the posture adjustment portion of the image forming apparatus according to the third embodiment of the present invention.

The image forming apparatus 100 according to a third embodiment includes a posture adjustment portion 300 shown in FIG. 8 and FIG. 9 instead of the posture adjustment portion 26.

The posture adjustment portion 300 includes a support member 31, an operation portion 301, the fourth gear 302, the fifth gear 303, the sixth gear 304, and the seventh gear 305. The configuration of the support member 31 is the same as that of the posture adjustment portion 26.

The operation portion 301 is provided outside a side wall portion 25C of the housing 25. As shown in FIG. 8, the operation portion 301 is formed in a shaft shape that penetrates through the side wall portion 25C of the housing 25 and projects along the horizontal direction. The operation portion 301 is rotatable about a third axis AX3 (see FIG. 4) along the projecting direction. The posture adjustment portion 300 adjusts the posture of the CCD 24 according to rotation of the operation portion 301.

The fourth gear 302 is provided below the support member 31 so as to be able to rotate about a fourth axis AX4 (see FIG. 9) along the vertical direction (up-down direction D1). The fourth gear 302 supports the support member 31. The fourth gear 302 displaces in the up-down direction D1 according to rotation. The fourth gear 32 is a spur gear.

For example, the fourth gear 302 has a shaft hole portion with a thread groove formed on an inner circumferential portion. A support screw 302A that projects upward from below the bottom portion 25B of the housing 25 into the housing 25 is inserted through the fourth gear 302. A thread groove having a shape corresponding to the thread groove of the inner circumferential portion of the fourth gear 302 is formed on an outer circumferential portion of the support screw 302A. The fourth gear 302 is supported by a thread groove formed on the outer circumferential portion of the support screw 302A so as to be able to displace in the up-down direction D1 according to rotation.

The fifth gear 303 is provided so as to be able to rotate about a fifth axis AX5 (see FIG. 9) parallel to the fourth axis AX4. The fifth gear 303 engages with the fourth gear 302. The fifth gear 303 is a spur gear.

For example, the fifth gear 303 includes a cylindrical shaft hole portion 303A (see FIG. 9) through which a rotating shaft erected on the bottom portion 25B of the housing 25 is inserted.

The sixth gear 304 is provided so as to be able to rotate integrally with the fifth gear 303. That is, the sixth gear 304 is provided so as to be able to rotate about the fifth axis AX5 (see FIG. 9). The sixth gear 304 is a worm wheel. The sixth gear 304 is provided above the fifth gear 303.

The seventh gear 305 is provided so as to be able to rotate integrally with the operation portion 301. That is, the seventh gear 305 is provided so as to be rotatable about the third axis AX3. The seventh gear 305 engages with the sixth gear 304. The seventh gear 305 is a worm and forms a worm gear together with the sixth gear 304. The seventh gear 305 is provided at a tip-end portion in the left direction of the operation portion 301.

In the posture adjustment portion 300, the rotational driving force input via the operation portion 301 causes the seventh gear 305, the sixth gear 304, the fifth gear 303, and the fourth gear 302 to rotate. Thus, the fourth gear 302 is displaced in the up-down direction D1, and the posture of the support member 31 supported by the fourth gear 302, that is, the posture of the CCD 24 is adjusted. In other words, the posture of the CCD 24 can be adjusted in the same manner as in the case of the posture adjustment portion 26.

Here, in the posture adjustment portion 300, the operation portion 301 is provided outside the side wall portion 25C of the housing 25. Thus, compared to the configuration in which an operation portion is provided below the bottom portion 25B of the housing 25, it is possible to further improve the operability of the operation portion 301.

Note that the posture adjustment portion 300 may include the second gear 32 and the third gear 35 instead of the fourth gear 302. In addition, instead of the operation portion 301, the posture adjustment portion 300 may include an operation portion provided so as to be able to move along the side wall portion 25C. For example, together with providing a rod-shaped operation portion extending in the left-right direction D3 so as to be able to move along the front-rear direction D2, it is also conceivable to provide, at the contact portion of the bottom surface of the support member 31 with the operation portion, an inclined surface that is inclined in the up-down direction along the direction of movement of the operation portion.

In a case where an operation portion used for adjusting the posture of the CCD 24 is formed in a rotatable shaft shape, it is difficult for the operator of the operation portion to know the amount of adjustment of the posture of the CCD 24, and thus it may be difficult to make fine adjustments.

On the other hand, in the image forming apparatus 100 according to a fourth embodiment of the present invention, it is possible to easily know the adjustment amount of the posture of the CCD 24 as described below.

Fourth Embodiment

Figure 10:
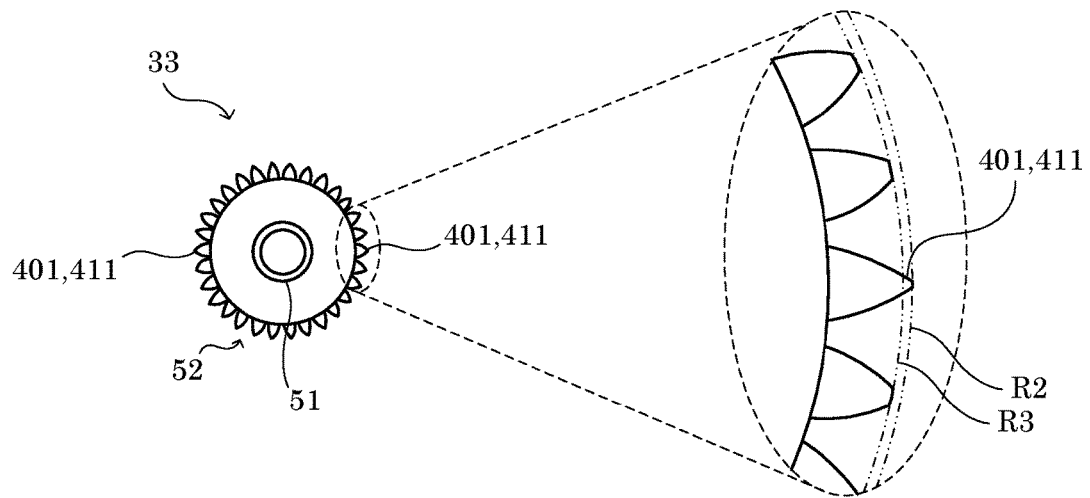
FIG. 10 is a plan view showing a configuration of a first gear of an image forming apparatus according to a fourth embodiment of the present invention.
Figure 11:
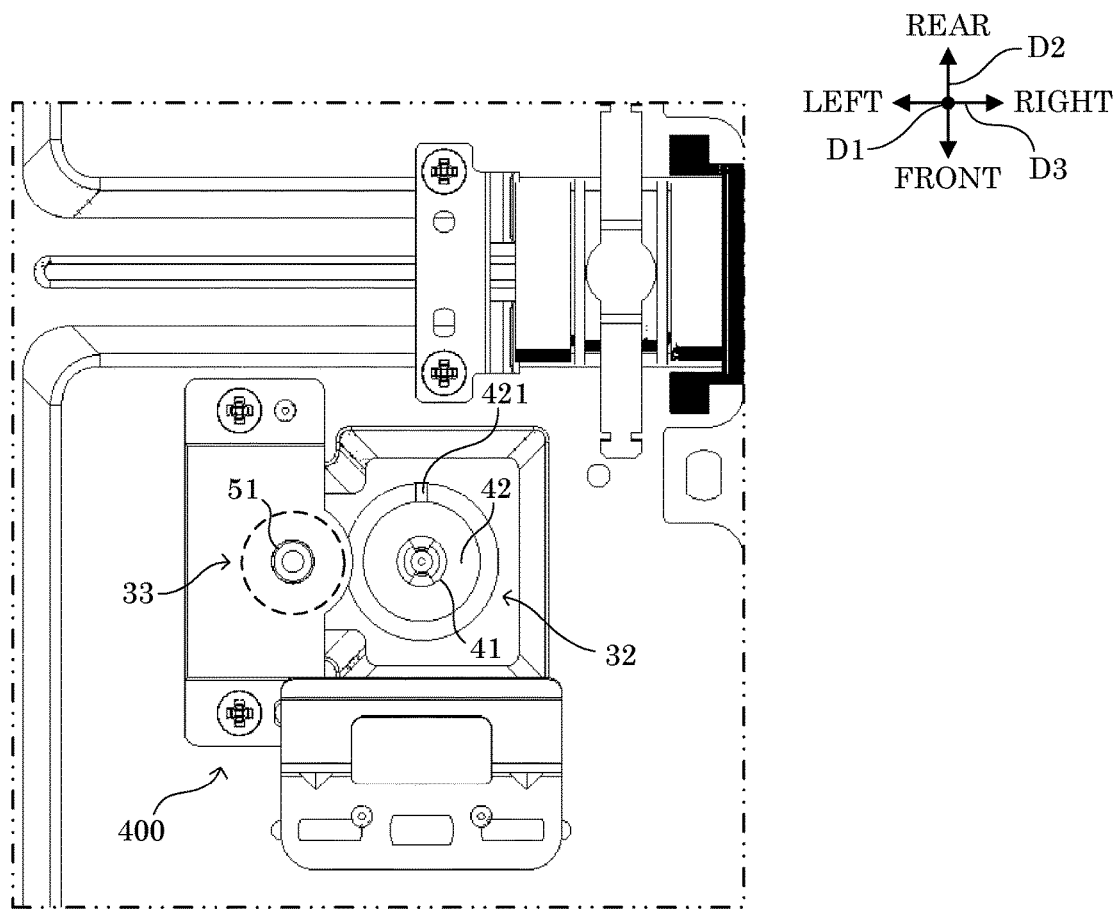
FIG. 11 is a plan view showing a configuration of a posture adjustment portion of the image forming apparatus according to the fourth embodiment of the present invention.

Next, a configuration of an image forming apparatus 100 according to a fourth embodiment of the present invention will be described with reference to FIG. 10 to FIG. 12. Here, FIG. 10 is a plan view showing the configuration of a first gear 33 provided in a posture adjustment portion 400. In addition, FIG. 11 is a diagram showing a state in which a support member 31 is removed from a housing 25. Note that in FIG. 10, a rotation path R2 of a tip of a tooth of a toothed portion 52 provided with a contact portion 411, and a rotation path R3 of a tip of a tooth not provided with a contact portion 411 are indicated by two-dot chain lines. In addition, in FIG. 12, a rotation path R4 of a mark portion 421 is indicated by a dashed line.

Figure 12:
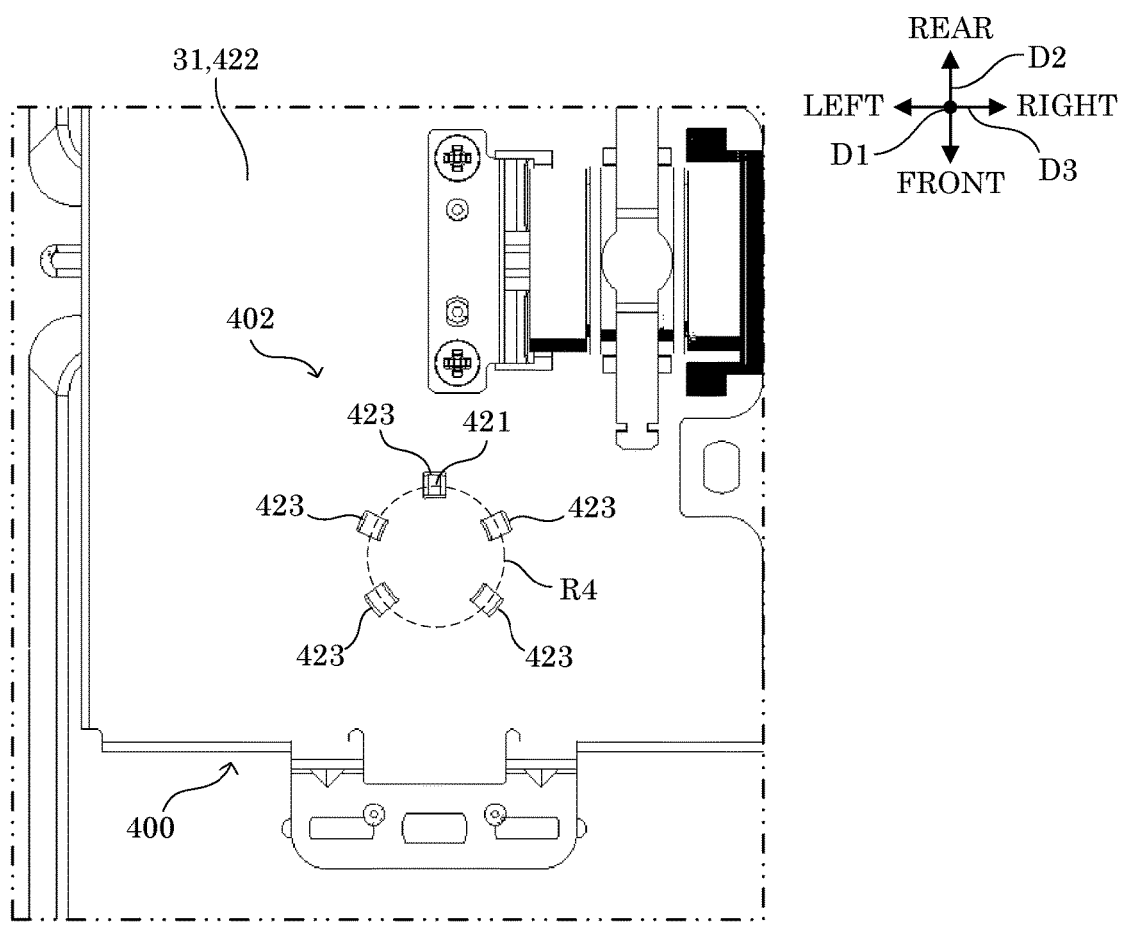
FIG. 12 is a plan view showing a configuration of the posture adjustment portion of the image forming apparatus according to the fourth embodiment of the present invention.

The image forming apparatus 100 according to the fourth embodiment includes a posture adjustment portion 400 shown in FIG. 11 and FIG. 12 instead of the posture adjustment section 26.

The posture adjustment portion 400 includes a support member 31, a second gear 32, a first gear 33, an operation section 34, and a third gear 35. The configurations of operation portion 34 and the third gear 35 are the same as those of the posture adjustment portion 26.

In addition, the posture adjustment portion 400 includes a first stimulus output portion 401 and a second stimulus output portion 402.

The first stimulus output portion 401 and the second stimulus output portion 402 output a stimulus that allows the operator of the operation portion 34 to perceive each time the operation portion 34 is rotated by a predetermined specific angle. For example, the specific angle is 180 degrees.

More specifically, the first stimulus output portion 401 is provided on the toothed portion 52 of the first gear 33 at an interval corresponding to the specific angle, and, at the tip of a tooth of the first gear 33, and includes a contact portion 411 formed so as to be able to come into contact with a bottom of teeth of the second gear 32.

As shown in FIG. 10, in the toothed portion 52 of the first gear 33, an addendum circle diameter of the tip of the tooth provided with the contact portion 411 is larger than the addendum circle diameter of the tip of the teeth not provided with the contact portion 411. Thus, the tip of the tooth provided with the contact portion 411 can come into contact with the bottom of the teeth of the second gear 32. When the contact portion 411 comes in contact with the bottom of the teeth of the second gear 32, stimulus energy generated at the time of contact is transmitted to the operator of the operation portion 34 via the operation portion 34. Thus, the operator can tactilely perceive that the operation portion 34 has been rotated by a specific angle.

In addition, the second stimulus output section 402 has a mark portion 421 and slits 423.

The mark portion 421 is formed on an upper side surface portion of the second gear 32 along a plane orthogonal to the second axis AX2 and spaced apart from the second axis AX2. For example, as shown in FIG. 11, the mark portion 421 is a protrusion formed on an edge portion of the upper side surface portion of the second gear 32. Note that the mark portion 421 may be configured so as to be visually distinguishable from other portions by a shape, color, pattern, or the like.

The slits 423 are formed in the support member 31 that functions as a cover portion 422 (see FIG. 11 and FIG. 12) that covers an upper side surface portion of the second gear 32. As shown in FIG. 12, the slits 423 are formed at specific intervals corresponding to the specific angle along the rotation path R4 (see FIG. 12) of the mark portion 421. The slits 423 expose the mark portion 421 to the outside of the cover portion 422.

More specifically, the specific interval is the amount of rotation of the second gear 32 according to the specific angle of rotation of the first gear 33. For example, in the image forming apparatus 100, when the first gear 33 is rotated by 180 degrees, which is the specific angle, the second gear 32 is rotated by 72 degrees. In this case, the specific interval is 72 degrees. Five slits 423 are formed at intervals of 72 degrees along the rotation path R4. Thus, the mark portion 421 is exposed to the outside of the cover portion 422 via a slit 423 each time the first gear 33 is rotated by the specific angle. That is, a visual stimulus is output. Therefore, the operator of the operation portion 34 can visually perceive via the contact glass 13 that the operation portion 34 has been rotated by the specific angle.

Here, in the image forming apparatus 100 according to the fourth embodiment, the mark portion 421 and the slits 423 are provided in a positional relationship such that the mark portion 421 is exposed to the outside of the cover portion 422 via the slits 423 at a timing when the stimulus energy is output by the contact portion 411. Thus, the operator of the operation portion 34 is able to perceive, both tactilely and visually, that the operation portion 34 has been rotated by the specific angle. Note that the mark portion 421 and the slits 423 do not have to be provided in the positional relationship described above.

In this way, in the image forming apparatus 100 according to the fourth embodiment, every time the operation portion 34 is rotated by the specific angle, a stimulus is output that the operator of the operation portion 34 is able to perceive. Thus, the operator of the operation portion 34 is able to easily know the adjustment amount of the posture of the CCD 24.

Note that contact portions 411 may be provided at the toothed portion 52 of the first gear 33 at intervals corresponding to the specific angle, and may be formed at a bottom portion of teeth of the first gear 33 so as to be able to come into contact with a tip of a tooth of the second gear 32. More specifically, in the toothed portion 52 of the first gear 33, the bottom of the teeth provided with the contact portion 411 is formed to have a larger root diameter than the bottom of teeth not provided with the contact portion 411.

In addition, the contact portions 411 may be provided at the toothed portion 43 of the second gear 32. Moreover, the contact portions 411 may be provided on both the first gear 33 and the second gear 32. Further, the contact portions 411 may be provided at the toothed portion 52 of the third gear 35.

The mark portion 421 may also be provided on the side surface portion of the first gear 33.

In addition, the image forming apparatus 100 according to the fourth embodiment may include one of either the first stimulus output portion 401 and the second stimulus output portion 402.

Further, instead of the posture adjustment portion 400, the image forming apparatus 100 according to the fourth embodiment may include a posture adjustment portion having an operation shaft that is able to rotate about an axis along one direction, and that adjusts the posture of any one of the light emitting portion 21A, the first mirror 21B, the second mirror 22A, and the third mirror 22B according to the rotation of the operation shaft. In this case, the first stimulus output section 401 and the second stimulus output section 402 may be provided in the posture adjustment portion.

The invention claimed is:

1. An image reading apparatus, comprising:
   optical elements comprising:
      a light emitting portion that emits light irradiated onto a document sheet;
      a photoelectric conversion portion that receives light reflected by the document sheet and outputs an electrical signal based on the light; and
      a lens and/or mirror arranged on an optical path between the light emitting portion and the photoelectric conversion portion;
   a posture adjustment portion having an operation shaft rotatable about a first axis and configured to adjust a posture of at least one of the optical elements according to rotation of the operation shaft; and
   a stimulus output portion configured to output a stimulus that allows an operator of the operation shaft to perceive rotation each time the operation shaft is rotated by a predetermined specific angle, wherein
   the posture adjustment portion has a first gear that rotates integrally with the operation shaft, and a second gear that is rotatable about a second axis parallel to the first axis and that engages with the first gear; and
   the stimulus output portion includes, in either one or both of the first gear and the second gear, contact portions that are provided at intervals corresponding to the specific angle and formed so that a tip of a tooth or a bottom of teeth of one of the first gear and the second gear is able to come into contact with a bottom of teeth or tip of a tooth of the other.

2. The image reading apparatus according to claim 1, wherein the posture adjustment portion has a cover portion configured to cover a side surface portion of either the first gear or the second gear along a plane orthogonal to a rotation axis of either the first gear or the second gear; and the stimulus output portion includes a mark portion formed on the side surface portion away from the rotation axis, and slits formed in the cover portion along a rotation path of the mark portion at intervals corresponding to the specific angle, and configured to expose the mark portion to outside of the cover portion.

3. The image reading apparatus according to claim 2, wherein the mark portion and the slits are provided in a positional relationship such that the mark portion is exposed to the outside of the cover portion via the slits at a timing when a stimulus is output by the contact portion.

4. An image forming apparatus, comprising:

the image reading apparatus according to claim 1; and an image forming portion configured to form an image based on image data output by the image reading apparatus.

5. An image reading apparatus, comprising:

optical elements comprising:

a light emitting portion that emits light irradiated onto a document sheet;

a photoelectric conversion portion that receives light reflected by the document sheet and outputs an electrical signal based on the light; and a lens and/or mirror arranged on an optical path between the light emitting portion and the photoelectric conversion portion;

a posture adjustment portion having an operation shaft rotatable about a first axis and configured to adjust a posture of at least one of the optical elements according to rotation of the operation shaft; and a stimulus output portion configured to output a stimulus that allows an operator of the operation shaft to perceive rotation each time the operation shaft is rotated by a predetermined specific angle, wherein the posture adjustment portion has a specific gear configured to rotate according to the rotation of the operation shaft, and a cover portion configured to cover a side surface portion of the specific gear along a plane orthogonal to a rotation axis of the specific gear; and the stimulus output portion includes a mark portion formed on the side surface portion away from the rotation axis, and slits formed in the cover portion along a rotation path of the mark portion at intervals corresponding to the specific angle, and configured to expose the mark portion to outside of the cover portion.

* * * * *